United States Patent Office 3,247,025
Patented Apr. 19, 1966

3,247,025
PHENOLIC RESIN AND BATTERY SEPARATOR
IMPREGNATED THEREWITH
Raymond D. Beaulieu, North Wilbraham, and John R. Le Blanc, Wilbraham, Mass., assignors to Monsanto Company, a corporation of Delaware
No Drawing. Filed Aug. 29, 1963, Ser. No. 305,505
9 Claims. (Cl. 136—146)

This invention relates to an improved composition of a phenol-aldehyde resin containing a particular surface active agent and to a cellulosic fibrous battery separator impregnated with the composition.

Permeable cellulosic fibrous battery separators are used extensively in batteries of either the conventional wet lead-acid type or the so-called "dry charge" lead-acid type. It is necessary that the fibrous structures thereof be protected from attack by the acid employed in the batteries. Therefore, when cellulosic fibrous battery separators are employed, they consist of cellulosic sheets impregnated with a phenol-aldehyde type of resin, which resin, when advanced to the infusible state, protects the fibers of the collulosic sheet from attack by the acid. In addition, it is necessary that the battery separators absorb or become rewetted by the battery acid rapidly, particularly in the so-called "dry charge" lead-acid type. This is essential so that the electrical resistance of the separator will reach its minimum value, within as short a time as possible, after addition of the battery acid. This requires incorporating a surface active agent with the phenol-aldehyde type of resin. To function properly, however, the surface active agent must allow rapid rewetting of the battery separator by the battery acid, must remain stable at high temperatures and must not leach out with water or with an acid solution.

The resistance of the surface active agent to leaching out by water or by the acid solution is important. If the surface active agent should leach out, it can result in poor negative plate formation when forming the battery. This will, in turn, reduce cell capacity, require higher charge voltages and reduce the useful service life of the battery.

Therefore, it is an object of this invention to provide a composition comprising in admixture a phenol-aldehyde resin and a particular surface active agent.

It is another object of this invention to provide an improved fibrous battery separator impregnated with the composition of this invention.

Briefly, the above and other objects of this invention are attained by incorporating with a phenol-aldehyde resin a particular surface active agent which surface active agent is the reaction product of particular polyoxyalkylene compounds and a cyclic anhydride.

The following examples are set forth to illustrate more clearly the principle and practice of this invention to those skilled in the art and not to be construed as limitations on the invention. Unless otherwise stated all parts and percentages are on a weight basis.

Example I

A one-stage water-dilutable phenol-formaldehyde resin is prepared by reacting 2.0 mols of formaldehyde per mol of phenol in the presence of a sodium hydroxide catalyst. The final resin product is diluted to a resin solids content of about 20 weight percent.

To 100 parts of the above resin, 4 parts of a surface active agent are added which surface active agent is prepared by reacting one mol of the condensation reaction product as prepared by Example I, Part B, of U.S. 2,674,619 with two mols of maleic anhydride in the presence of about 0.01 mol of a phosphoric acid catalyst. The reaction is carried out at about 90° C. and in a nitrogen atmosphere until the maleic anhydride functionally equilibrates as determined by infra-red spectral bands. The infra-red spectral bands are 5.4 and 5.6 microns for the maleic anhydride carbonyl. As the reaction proceeds, the ester carbonyl infra-red spectral band forms at 5.8 microns. When the reaction reaches equilibrium, the ratio of maleic anhydride carbonyl bands to the ester carbonyl bands remains constant. The maleic anhydride functionality is now considered as having equilibrated. The resulting product is the maleic anhydride mono-ester of the polyoxypropylene glycol/ethylene oxide condensate and has a molecular weight of about 2650. This resin composition is designated as A.

Example II

Example I is repeated except that in place of the polyoxypropylene glycol/ethylene oxide condensate employed therein, an ethylene diamine/propylene oxide/ethylene oxide condensate is employed as prepared by Example 5 of U.S. 2,674,619 and four mols of maleic anhydride are employed in place of two moles thereof.

This resin composition is designated as B.

Example III

Example I is repeated except that only the polyoxypropylene glycol/ethylene oxide condensate is admixed with the phenol-formaldehyde resin without reacting the condensate with maleic anhydride.

This resin composition is designated as C.

Example IV

*Part A.*—Resin compositions A, B and C of Examples I, II and III are used to treat separately permeable cellulosic fibrous sheets 6" x 6" by hand-dipping the sheets in the resin compositions until the samples are thoroughly impregnated with the resin compositions. The fibrous cellulosic sheets employed herein have a Gurley porosity of about 5 seconds using a 5 oz. cylinder and a ¼ square inch orifice.

The treated samples are dried at about 25° C. for 30 minutes and are then subjected to a temperature of about 170° C. for about 10 minutes. The cured samples can now be used as battery separators and are found to have picked up about 30% by weight of the resin composition. The samples are designated as A, B and C corresponding to the resin compositions A, B and C of Examples I, II and III.

As a control, the one-stage phenol-formaldehyde resin of Example I is used, without any surface active agent, to treat the same type of permeable cellulosic fibrous sheets as employed with resin compositions A, B and C and under the same conditions. These battery separators are designated as D.

*Part B.*—The samples so prepared in Part A are completely immersed in a 14% hot (60° C.) aqueous sulphuric acid solution for about 30 minutes. The samples are removed and washed with copious amounts of running hot water at about 65° C. for about 1 hour. The samples are then dried at 177° C. for about 15 minutes.

To determine rewettability of the treated samples, they are gently floated on the surface of a 37% aqueous sulphuric acid solution until they are completely rewetted. Time of rewetting is measured with a stopwatch from the time the samples are floated on the surface of the acid solution until they are completely rewetted. The results are as follows:

TABLE I

| Sample: | Rewettability time |
| --- | --- |
| A | Instantaneous rewetting. |
| B | Instantaneous rewetting. |
| C | 33 seconds. |
| D | No rewetting after 30 minutes. |

This example clearly shows that when cellulosic fibrous battery separators are prepared employing the resin composition of this invention, extremely fast rewetting of the battery separators is obtained with an acid solution comparable to that employed in the lead-acid batteries.

*Example V*

This example is set forth to show the negative plate formation when employing battery separators A, B and C in assembling separate batteries containing these separators and prepasted gridplates. Since the rewetting of battery separator D is so poor, it is not used in assembling batteries to determine the negative plate formation. The gridplates are the basis for the formation of the positive and the negative plates. The batteries are designated as Battery A, which contains battery separators A, Battery B, which contains battery separators B and Battery C, which contains battery separators C. Each battery is subjected to a steady charge of four amperes for 41 hours. The positive plate is oxidized to lead dioxide and the negative plate is reduced to sponge lead. In general, the higher the metallic luster of the sponge lead upon scratching the surface thereof, the better the negative plate formation which in turn results in prolonged battery life and better battery performance. The results are visually observed as follows:

Battery A—lead formation on negative plate shows high metallic luster upon scratching the surface thereof.
Battery B—lead formation on negative plate shows high metallic luster upon scratching the surface thereof.
Battery C—lead formation on negative plate shows no metallic luster upon scratching the surface thereof and has profuse mottling indicating poor plate formation.

This invention is directed to a resin composition comprising in admixture a phenol-aldehyde resin and a particular surface active agent. It has been surprisingly discovered that by employing the particular surface active agent of this invention with a phenol-aldehyde resin which composition is used to impregnate permeable cellulosic fibrous sheets to prepare battery separators therefrom, an effect is obtained which results in the battery separators having excellent rewettability and batteries employing the battery separators of this invention having excellent negative plate formation. These particularly desirable properties are shown by way of Example IV and Example V. In particular, note the instantaneous rewettability of the battery separators impregnated with the composition of this invention. The examples also show that when using a surface active agent which is a straight polyoxyalkylene compound as is known in the art, the negative plate formation is deficient.

In the practice of this invention, it is essential that the surface active agent employed herein be the reaction product of a particular polyoxyalkylene compound with cyclic anhydride which reaction product is the anhydride mono-ester of the particular polyoxyalkylene compound. The anhydride mono-ester of the particular polyoxyalkylene compound so obtained by the reaction corresponds to the following formula:

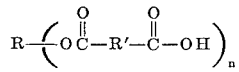

wherein R is the mono-ester residue of any polyoxyalkylene compound containing 1–10 primary terminal hydroxyl groups; R' is independently selected from the group consisting of a benzene ring and an alkyl radical of 2–18 carbon atoms and $n$ is any integer from 1–10 but never exceeding the number of primary terminal hydroxyl groups attached to the polyoxyalkylene compound. The surface active agent of this invention should have a molecular weight of about 1,500–10,000 and preferably 2,500–4,000.

The polyoxyalkylene compounds employed in the practice of this invention can be any polyoxyalkylene compound which contains 1–10 primary terminal hydroxyl groups and include those set forth in U.S. Patent 2,674,619. In addition, the polyoxyalkylene compound employed herein includes the reaction products of ethylene oxide with such compounds as 1,2 cyclic oxides other than ethylene oxide, e.g., styrene oxide, butylene oxide, isobutylene oxide, propylene oxide, etc., polyols, e.g., glycol, glycerol, polyvinyl alcohol, styrene-allyl alcohol copolymers, etc., aliphatic amines containing 1–12 carbon atoms e.g., propylene diamine, diethylene triamine, penta ethylene tetramine, hexamethylene diamine, isodecylamine, etc., aromatic amines containing 1–2 benzene rings, e.g., aniline, methylenedianiline, 2,2-bis(4-aminophenyl propane), etc., phenols including bisphenol A and phenol-formaldehyde reaction products of less than one mol of formaldehyde per mol of phenol. In some cases it may be desirable to employ only a polyoxypropylene base material as the polyoxyalkylene compound such as polyoxypropylene glycol. However, in the practice of this invention the preferred polyoxyalkylene compound is the reaction product of polyoxypropylene base and ethylene oxide wherein the ethylene oxide constitutes 5–60 weight percent of the polyoxyalkylene compound and preferably 5–20 weight percent thereof.

In the practice of this invention, the polyoxyalkylene compound to be reacted with the cyclic anhydride should also have a number average molecular weight of about 1,500 to about 10,000 and, preferably, 2,500–4,000. The number average molecular weight range of the polyoxyalkylene compound employed herein is set forth merely for convenience and to show the practical range for allowing ease of application of the resin composition for impregnating a cellulosic fibrous sheet so as to insure thorough impregnation thereof. It is conceivable, therefore, that the polyoxyalkylene compound or the surface active agent having a number average molecular weight of 25,000 may possibly be used in the application of impregnating a cellulosic fibrous sheet.

Any phenol-aldehyde resin may be employed in the practice of this invention. Particularly useful, however, are the phenol-formaldehyde resins which are generally prepared by the reaction of about 0.5–3.0 mols of formaldehyde per mol of phenol in the presence of appropriate catalysts. The phenol-formaldehyde resins may be either a one-stage resin recovered in water, a one-stage resin recovered in a water-organic solvent or a liquid novolac two-stage resin having water associated with it. The preparation of these resins is generally well-known and the type of phenol-formaldehyde resin obtained depends upon the ratio of formaldehyde to phenol and the catalyst chosen for the reaction. As is well known in the art, the catalyst employed in the reaction may be either acidic or basic in nature. The preferred phenol-aldehyde resin to be employed in the practice of this invention is a phenol-formaldehyde resin prepared by reacting 1.0–3.0 mols of formaldehyde per mol of phenol in the presence of an alkaline catalyst and wherein the reaction product is recovered in water. The phenol-formaldehyde resin employed in the practice of this invention should also have a water tolerance of 0.1 volume of water per equal volume of resin to greater than 50 volumes of water per volume of resin. However, as a practical limit, the water tolerance should be at least 5 volumes of water per one volume of resin.

Typical examples of other phenol-aldehyde resins which can be employed in the practice of this invention are resorcinol-formaldehyde, catechol-formaldehyde, phenol-acetaldehyde, and alkylated phenol-formaldehyde resins having an alkyl group containing 1–3 carbon atoms such as xylenol-formaldehyde, etc.

When employing the resin composition of this invention, the composition should consist of 0.1–5 parts of the surface active agent of this invention per 100 parts by weight of the phenol-aldehyde resin solids. Preferably, the resin composition should consist of 0.5–4 parts by weight of the surface active agent per 100 parts by weight of the phenol-aldehyde resin solids.

The cyclic anhydride employed herein to be reacted with the polyoxyalkylene compound to provide the particular surface active agent of this invention and which can be used in place of the maleic anhydride used in the examples include citraconic, glutoric, phthalic, malic, succinic, and citric. The preferred cyclic anhydride to be employed in the practice of this invention is maleic anhydride.

This invention is also directed to a cellulosic fibrous permeable battery separator consisting of a permeable cellulosic fibrous sheet impregnated with the resin composition of this invention and wherein the phenol-aldehyde resin is advanced to the infusible state. The cellulosic fibrous battery separator of this type is generally prepared by first admixing the phenol-aldehyde resin and the surface active agent. The surface active agent may be added either as 100% active materials or as a solution in a solvent compatible with the surface active agent and the phenol-aldehyde resin. The cellulosic fibrous sheet is then treated with the composition of this invention by either the wet-web saturation method or the dry-web method. In either method, it may be desirable to dilute the resin composition in order to obtain the desired pickup. The treated cellulosic sheet is dried to remove excess solvent and is then subjected to a temperature of about 200° F. to about 600° F. in order to advance the phenol-aldehyde resin to an infusible state. The time of exposure of the treated cellulosic fibrous sheet to these temperatures will vary from approximately 30 minutes at 200° F. to at least one minute at 600° F. In addition, the cellulosic fibrous battery separator is generally ribbed to increase its resistance to degradation during use thereof in a lead-acid battery. Generally, it is also desirable to impregnate the cellulosic fibrous sheet with about 20–50 weight percent of the resin composition of this invention.

Alternatively, the cellulosic fibrous sheet may be first treated with the phenol-aldehyde resin alone, and secondly, in a separate operation, treating the cellulosic fibrous sheet with the surface active agent either before or after subjecting the phenol-aldehyde treated fibrous sheet to the elevated temperatures.

Although the preferred battery separator employed in the practice of this invention is a cellulosic fibrous permeable structure having a Gurley porosity of about 1–25 seconds when using a 5 oz. cylinder and a ¼ sq. in. orifice, other battery separator structures may be prepared by either incorporating the resin composition of this invention or just the surface active agent alone. For example, the resin composition may be used to bind and coat battery separators prepared from glass fibers or diatomaceous earth or combinations of both with or without cellulosic fibers. In addition, the surface active agent alone may be incorporated in polyvinyl chloride separators, hard rubber separators or other materials wherein speedy rewettability by the battery acid solution is desired.

The advantages of this invention are found in that the battery separators employing the resin composition of this invention are rapidly rewetted by the battery acid solution. The electrical resistance of the battery separator rapidly reaches its minimum value well within 10 minutes after addition of the battery acid to the battery. This advantage allows almost immediate use of the so-called "dry charge" lead-acid battery without injuring the battery separators or the battery itself. In addition, good negative plate formation is obtained when assembling batteries employing battery separators impregnated with the resin composition of this invention as shown by Example V herein.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A resin composition comprising in admixture a phenol-aldehyde resin and a particular surface active agent wherein the particular surface active agent is the reaction product of a polyoxyalkylene compound and a cyclic anhydride, the reaction product thereof corresponding to the following formula:

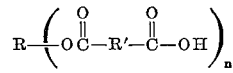

wherein R is the mono-ester residue of any polyoxyalkylene compound containing 1–10 primary terminal hydroxyl groups, R' is independently selected from the group consisting of a benzene ring and an alkyl radical of 2–18 carbon atoms and $n$ is an integer from 1–10 but never exceeding the number of primary terminal hydroxyl groups attached to the polyoxyalkylene compound.

2. The resin composition of claim 1 wherein the polyoxyalkylene compound employed therein is the reaction product of ethylene oxide and a compound selected from the group consisting of 1,2 cyclic oxides other than ethylene oxide, polyols, aliphatic amines containing 1–12 carbon atoms, aromatic amines containing 1–2 benzene rings, phenols and phenol-formaldehyde reaction products of less than one mol of formaldehyde per mol of phenol.

3. The resin composition of claim 1 wherein the admixture consists of 100 parts of the phenol-aldehyde resin solids and 0.1–5 parts of the particular surface active agent.

4. The resin composition of claim 1 wherein the polyoxyalkylene compound is the condensation product of a polyoxypropylene base and ethylene oxide wherein the ethylene oxide units constitute 5–60 weight percent of the polyoxyalkylene compound.

5. The resin composition of claim 4 wherein the cyclic anhydride is maleic anhydride.

6. The resin composition of claim 1 wherein the phenol-aldehyde resin is the condensation reaction product of 1.0–3.0 mols of formaldehyde per mol of phenol.

7. A cellulosic fibrous permeable battery separator thoroughly impregnated with a resin composition which has been advanced to the infusible state and wherein said resin composition comprising in admixture a phenol-aldehyde resin and a particular surface active agent wherein the particular surface active agent is the reaction product of a polyoxyalkylene compound and a cyclic anhydride, the reaction product thereof corresponding to the following formula:

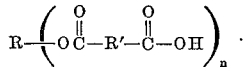

wherein R is the mono-ester residue of any polyoxyalkylene compound containing 1–10 primary terminal hydroxyl groups, R' is independently selected from the group consisting of a benzene ring and an alkyl radical of 2–18 carbon atoms and $n$ is an integer from 1–10 but never exceeding the number of primary terminal hydroxyl groups attached to the polyoxyalkylene compound.

8. The cellulosic fibrous permeable battery separator of claim 7 wherein the polyoxyalkylene compound employed therein is the reaction product of ethylene oxide and a compound selected from the group consisting of 1,2 cyclic oxides other than ethylene oxide, polyols, aliphatic amines containing 1–12 carbon atoms, aromatic amines containing 1–2 benzene rings, phenols and phenol-formaldehyde reaction products of less than one mol of formaldehyde per mol of phenol.

9. The cellulosic fibrous permeable battery separator of claim 7 wherein the resin composition comprises 20–50 weight percent of the cellulosic fibrous permeable battery separator.

References Cited by the Examiner
UNITED STATES PATENTS

| | | | |
|---|---|---|---|
| 2,700,694 | 1/1955 | Fernald | 136—146 |
| 2,733,114 | 12/1956 | McAuslan | 136—146 |
| 2,980,750 | 4/1961 | Mills | 136—146 |

ALLEN B. CURTIS, *Primary Examiner.*